United States Patent
Sagiroglu et al.

(10) Patent No.: US 9,378,406 B2
(45) Date of Patent: Jun. 28, 2016

(54) SYSTEM FOR ESTIMATING GENDER FROM FINGERPRINTS

(71) Applicant: Seref Sagiroglu, Ankara (TR)

(72) Inventors: Seref Sagiroglu, Ankara (TR); Uraz Yavanoglu, Ankara (TR); Eyup Burak Ceyhan, Ankara (TR); Mehmet Emre Akyil, Ankara (TR)

(73) Assignee: Seref Sagirouglu, Ankara (TR)

( * ) Notice: Subject to any disclaimer, the term of this patent is extended or adjusted under 35 U.S.C. 154(b) by 0 days.

(21) Appl. No.: 14/408,102

(22) PCT Filed: Jun. 14, 2013

(86) PCT No.: PCT/TR2013/000185
§ 371 (c)(1),
(2) Date: Dec. 15, 2014

(87) PCT Pub. No.: WO2014/011127
PCT Pub. Date: Jan. 16, 2014

(65) Prior Publication Data
US 2015/0178544 A1    Jun. 25, 2015

(30) Foreign Application Priority Data
Jun. 15, 2012   (TR) .................................. 2012 07018

(51) Int. Cl.
*G06K 9/00* (2006.01)
*G06K 9/62* (2006.01)

(52) U.S. Cl.
CPC .............. *G06K 9/0008* (2013.01); *G06K 9/001* (2013.01); *G06K 9/6262* (2013.01); *G06K 2009/00946* (2013.01)

(58) Field of Classification Search
None
See application file for complete search history.

(56) References Cited

U.S. PATENT DOCUMENTS

| | | | |
|---|---|---|---|
| 2003/0039381 A1* | 2/2003 | Ziesig | 382/124 |
| 2004/0068669 A1* | 4/2004 | Uchida | 713/202 |
| 2004/0133582 A1* | 7/2004 | Howard | G06K 9/00006 |

(Continued)

FOREIGN PATENT DOCUMENTS

TR   2006/04511   5/2002

OTHER PUBLICATIONS

Acree, Mark A. "Is there a gender difference in fingerprint ridge density?." Forensic science international 102.1 (1999): 35-44.*

(Continued)

*Primary Examiner* — Stephen R Koziol
*Assistant Examiner* — Sean Conner
(74) *Attorney, Agent, or Firm* — Ladas & Parry LLP

(57) ABSTRACT

A method for detecting the gender only from a person's fingerprint data in real time. Testing consists of determining if the fingerprint is taken from the right hand or the left hand, taking a core point as reference from a selected fingerprint, analyzing the size of an obtained fingerprint part, drawing a diagonal line, then automatically determining ridge lines crossed by the diagonal line, calculating the ridge counts, determining ridge thicknesses, determining the numbers of black and white pixel from the obtained values, determining average fingerprint ridge counts for men and women, combining these parameters for applying them to intelligent system, preparing the structure of the system, training and testing the system, and performing these processes automatically on a computer or a web-based intelligent system which consists of different modules.

2 Claims, 2 Drawing Sheets

(56) References Cited

U.S. PATENT DOCUMENTS

| | | | |
|---|---|---|---|
| 2004/0234111 A1 | 11/2004 | Mueller | |
| 2005/0058325 A1* | 3/2005 | Udupa et al. | 382/125 |
| 2010/0142764 A1* | 6/2010 | Ikegami | G06K 9/00 382/115 |

OTHER PUBLICATIONS

Badawi, Ahmed, et al. "Fingerprint-Based Gender Classification." Proceedings of the 2006 International Conference on Image Processing, Computer Vision, & Pattern Recognition, Las Vegas, Nevada, USA, Jun. 26-29, 2006, vol. 1. 2006.*

Gutiérrez-Redomero, Esperanza, et al. "Variability of fingerprint ridge density in a sample of Spanish Caucasians and its application to sex determination." Forensic Science International 180.1 (2008): 17-22.*

Kralik, Miroslav, and Vladimir Novotny. "Epidermal ridge breadth: an indicator of age and sex in paleodermatoglyphics." Variability and Evolution 11 (2003): 5-30.*

Verma, Manish, and Suneeta Agarwal. "Fingerprint Based Male-Female Classification." Proceedings of the International Workshop on Computational Intelligence in Security for Information Systems CISIS'08. Springer Berlin Heidelberg, 2009.*

* cited by examiner

SYSTEM FOR ESTIMATING GENDER FROM FINGERPRINTS

RELATED APPLICATION

This application is a national phase entry under 35 USC 371 of International Patent Application No PCT/TR2013/000185 filed on 14 Jun. 2013, which was published on 16 Jan. 2014 with international Publication Number WO 2014/011127 A1, which claims priority front Turkish Patent Application No. 2012/07018 filed 15 Jun. 2012, the disclosures of which are incorporated in the entirety by reference herein.

Our invention is a method that examines only a person's fingerprint data and from that data, the intelligent system detects the person's gender from it in realtime. The method is based on the theory and practice that gender of the person can be estimated by checking and countering to the fingerprint ridge densities of the person.

The science of biometrics which can be called as one of the most important elements of security and identification, is a remarkable technology that is based on a wide and rich literature and it has advanced standards. In spite of many scientific studies, a possible relationship between gender and fingerprint have been discussed in a few biometric literature so far. The application that provides an estimation of gender from fingerprint will make an extraordinary impact to the investigation of criminal cases and it will provide an important step to sort it out criminal issues.

The statistical analysis of gender estimation from fingerprint which are made on different races in USA, India and Spain, can be obtained by acceptable rates of accuracy. The common aspects of these studies are; the distribution of the fingerprint data used by gender are equal, the used parts of fingerprint data are the same, the obtained data are processed with the same statistical methods and in all of the studies, the used part of fingerprint is taken with the center (core) point is taken from a reference points or parts. The gender of individuals can be found by looking at the density of the ridges which are a part of minutiae points. The studies in the literature have shown that women have more ridges than men, if a certain area of the fingerprint is taken, women have higher ridge density than men. Ridge density is the distance between the two neighbor valley's cores. In all of these studies, it is observed that ridge density is a significant feature in classification of gender.

In a study which was made in America, the fingerprints which are taken from police center are used, and these fingerprints belong to 100 Afro-American women and 100 Afro-American men, 100 Caucasian women and 100 Caucasian men. The fingerprints are taken from criminals whose age are in the range between 18-67 and totally 400 fingerprint data are used. As a result, it is observed that if the number of ridge density on a fingerprint is 11 ridges/25 $mm^2$ or lower, then the possibility of the finger which is worked on may belong to a man. Also, if the number of ridge density on a fingerprint is ridges/25 $mm^2$ or higher, then the possibility of the finger which is worked on may belong to a woman.

In another study, fingerprints of people who are in Karnataka, it is in southern of India are used. The fingerprints which are belong to 250 women and 250 men between the ages of 18-60. As a result, it is observed that the average density of the fingerprints is 12.8 ridges/25 $mm^2$ for men and the average density of the fingerprints is 14.8 ridges/25 $mm^2$ for women.

In another study which is up to date and made in Spain, 200 (100 men, 100 women) fingerprints are used and unlike other studies, the all fingerprints from 10 fingers are used. In this study, the fingerprints which are taken from Caucasian origin people whose ages are between the ages of 20-30 are examined. The results obtained from the study reported that if the fingerprint's ridge count is 16 ridges/25 $mm^2$ or lower it belongs to a man and if the fingerprint's ridge count is 17 ridges/25 $mm^2$ or higher it belongs to a woman.

The features of the above-mentioned studies are mainly based on statistics, they count ridges one by one by hand. The number of samples are from different races and certain ages, and only ridge density is considered. The studies described above were done essentially for creating a statistical database. In the current state of this, there are no any available system which can count and analyze genders from fingerprints automatically.

Lets review patent applications. The patent application named as "A method for controlling the fingerprint" which was registered to Turkey Patent Institute by 2006/04511 reference number on 27 May 2002. In this patent, a method for controlling a fingerprint whose reference data is saved to a portable data storage is described. Within the patent application registered with the reference number 2006/04511, the reference data which consist of minutiaes and pores includes positions, orientations and an alignment vector. In accordance with the invention, during the fingerprint control, firstly, the measured values that gives taken fingerprints' real value will be taken, minutiaes and alignment vectors which are measured values will be read from portable data storage and minutiaes will be compared with the related reference data. Right after, the position of the pores by minutiaes will be transferred to the portable data storage and pores will be checked in portable data storage.

In another application, a fingerprint based identification system is registered with the number as 2006/04511. Fingerprint values corresponding to the identity of people registered in the system must be first defined to the system. The person's identity information (gender, name, registration number etc.) will be called from the system memory. If a fingerprint which is not previously registered to the system is entered to the system (the information of the person is not registered to the database, the user's details can not be called from the system. This system can not be used to examine people who are not registered in the system.

It should be emphasized that none of these patents are not related to the patent introduced in this application.

DESCRIPTION OF THE FIGURES

1. Fingerprints are captured from a fingerprint reader.
2. A core point is found on the fingerprint image.
3. A specific region is selected on the image. An example of selected region is taken and converted to usable form.
4. A diagonal shape is achieved from the form of selected region.

In our invention, ridge densities for Turkey were analysed for women and men for the first time. It is also observed for the first time that women have higher ridge densities than men in Turkey. The average ridge density rate is then calculated from a fingerprint and this rate is used in this invention. In order to predict a person's gender from a fingerprint, we first created an intelligent system based on artificial neural networks. From the state of fingerprint's ridges, ridge densities are classified quantitatively as "thick" or "thin" and processed to find ridge values and their variations. The invented system is configured and trained to learn the relationship between the genders and fingerprints and then predict gender from only fingerprints. 1200 fingerprints which are the largest number in the literature were used for doing the processes automatically in the development stages. A stand-alone and web based application software were developed for the proposed model. An intelligent system predicts a person's gender from a fingerprint with the 95% accuracy.

Figure 1:
Figure 2:
Figure 3:
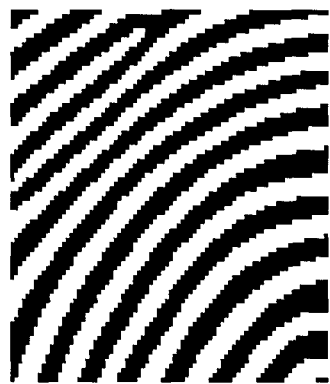
Figure 4:
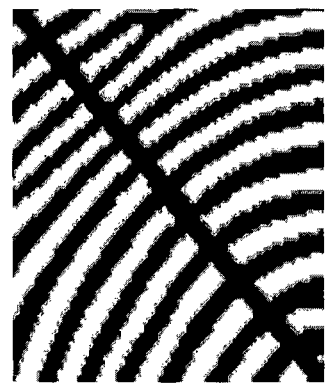

The developed software acquires fingerprint images first. The fingerprint images were then analysed to find out ridge densities for further processes such as finding a specific region, specific volume or core point/s, checking a fingerprint belonging to left or right hand, calculating the number of ridges, etc. If the fingerprint is taken from left-hand, the implemented software takes the upper-right region and if the fingerprint is taken from right-hand, the implemented software takes the upper-left region of the fingerprint's core point for further processes.

The processes given above are used in the intelligent system to estimate gender from fingerprints. It is expected that this invention will especially provide new perception to police and intelligent forces, speed up the criminal process in criminal cases from obtained fingerprints at the crime scene, facilitate the entry and exit control in the places that are special for men or women, be poineering study for developing new application in Biometrics.

With this developed intelligent system, the person's gender can be predicted easily and effectively. It is expected that the developed system, by examining fingerprint which is captured from any object's surface at the scene and by decomposing the owner of the fingerprint in gender pool uniqely, can reduce to the number of suspicious, both time and energy spent for litigation and investigation processes, provide new applications and oppurtunities for Automatic Fingerprint Identification Systems. Finally, it can be a pioneering study in the field of biometrics.

Our invention can be used for determining genders from fingerprint data which are entered to or obtained from a fingerprint with the help of this developed system without having knowledge about gender or any database record before. In this way, genders can be estimated from this system without any previous records belonging to persons' fingerprints and identity information.

Gender estimation from only fingerprints can be achieved from the steps given below:

1. Fingerprints were initially achieved from fingerprint readers or the crime scene to obtain the genders.
2. A number of equal male and female fingerprints having different ages are selected for further processes.
3. Establishing a database covering the selected appropriate number of men and women fingerprints and taking fingerprints with an Automated Fingerprint Recognition System (AFIS) which is available on the market.
4. Developing a software for determining genders from fingerprints with the help of analysing selected image part, taking or croping a frame (for example 4×4 mm, 5×5 mm, 6×6 mm, 7×7 mm, 8×8 mm etc.). if the right fingerprint is taken, the image is taken from the upper-left part of the core point. If the left fingerprint is taken, it is then taken from the upper-right part of the core point.
5. The framed fingerprint image is binarised to black-white state (binary state). Noise reduction and improvement procedures are then applied.
6. Plotting a diagonal line process to the framed fingerprint image captured from the core point to upper-left corner of sample 5×5 mm or 7×7 mm part of processed fingerprint, preparing a bit string line array with taking pixels which are on this diagonal line as black (1) and white (0), determining or calculating the number of black and white bite strings one by one.
7. Determining the number of independent "black" characters (1's string) in diagonal line array and assigning this number as the no of ridges for a fingerprint,
8. Determining the length of "black" character string with considering the number of independent 1s and doing this process for all ridges and obtaining ridge thickness from that process, finding 1s and 0s thickness and ridge counts,
9. Estimating an average ridge value of men and women fingerprints in Turkey with following the procedures specified above,
10. Determining the input and output parameters for intelligent system with considering obtained data. Input parameters: orthogonal pixel value of taken part of fingerprint, obtained ridge count, ridge thickness, the number of average ridge values of men and women obtained from Turkish citizenship. Output values: The numeric values of "1" and "−1" or "1" and "0" which are used to distinguish men and women from each other.
11. Building up an intelligent system model (ANN structure) based on the number of input and output values, determining no of hidden layer and neurons in the layer, selecting functions which will be used in neurons with using trial and error approach or using genetic or anova techniques.
12. Selecting an appropriate existing learning algorithm in literature (back propagation, Levenberg-Marquardt, genetic algorithm, fuzzy logic etc.) for training the created model.
13. Training the created ANN model with a chosen learning algorithm by the selected number of data samples until getting targeted error rate or getting targeted performance (such as 0.001 RMS error).
14. After training, the developed intelligent system is tested with chosen number of fingerprint data (it is expected that test result should not be larger than 0.05 RMS error),
15. Determining a threshold level that separates a man and a woman from each other and predicting the gender based on a defined value. The gender is a man if this value is between 0 and 1. The gender is a woman if this value is between 0 and −1.
16. To realize the procedures mentioned above automatically, a stand-alone version for PC and a web-based version for web-based access have been developed, these versions consist of parts such as a module for taking part of fingerprints, selecting the size of fingerprint's picture (for example 5×5 mm, 6×6 mm, 7×7 mm etc.) and the size of this part, creating bit string for determining ridge count in selected fingerprint part, finding the ridge count and average of thickness in bit string and adding this to the system, training and testing the developed intelligent model, accessing the system securely, logging the access to the system, informing user's via email or sms, and developing web service for accessing to the intelligent model.
17. Combining the developed modules/parts in software platform and integrating the fingerprint reader hardware to this developed platform,
18. Adding the tested intelligent ANN model to developed platform for using permanently for realtime web-based test or standalone use,
19. After testing the system with some different fingerprint image data, preparing the system into a realtime processes in use,
20. Taking the system into service for users who desire to learn their genders at least with an accuracy of % 95 rate.

Our invented system works as, a web-based or a stand-alone for PC with accessing automatically to the fingerprint information in real time. The system realizes the gender estimation with a trained intelligent ANN model.

The patented proposed system in this application is based on an intelligent model learning the relationship between genders and the densities of fingerprint ridge counts. Firstly, the relationship is learnt and this developed model is then used for unseen data which is not known before.

Firstly, the appropriate number of data sets is created for training the system and the system is then tested. For determining gender of a person from only fingerprint; ridge density, ridge count and the parameters belongs to them are the inputs of the system, the output is the numeric value corresponding to the gender depending on this fingerprint. As a result, the system is trained to learn the relationship between fingerprint ridge density and gender. After this intelligent system is trained well the relationship between input and output, the fingerprint of a desired person is then applied to the system with a finger scanner in real time. Gender information is created automatically with the help of the trained system or the developed intelligent model.

The invention claimed is:

1. A method for real time gender estimation using only fingerprint information comprising:
    obtaining fingerprints which include an equal number of fingerprints from men and women of different ages and ethnicities taken from an Automated Fingerprint Recognition System (AFIS),
    establishing an appropriate fingerprint database of the obtained fingerprints,
    determining whether a fingerprint is from a right hand or a left hand,
    cropping an area of 4×4 mm, 5×5 mm, 6×6 mm, 7×7 mm, or 8×8 mm starting from a core point of the fingerprint to an upper-left part of the fingerprint if the fingerprint is from a right hand,
    cropping an area of 4×4 mm, 5×5 mm, 6×6 mm, 7×7 mm, or 8×8 mm starting from the core point of the fingerprint to an upper-right part of the fingerprint if the fingerprint is from a left hand,
    applying improvement and noise reduction procedures on the cropped area of the fingerprint,
    plotting a diagonal line starting from the core point to an upper-left corner if the fingerprint is from a right hand,
    plotting a diagonal line from the core point to the upper-right corner if the fingerprint is from a left hand,
    preparing a bit string line array by taking pixels on the diagonal line as black and white,
    determining the number of independent black clusters in the line array for obtaining a ridge count,
    determining a black character length by calculating the number of independent black pixels for all ridges for obtaining a ridge thickness,
    obtaining average ridge thickness and ridge count from the fingerprints of men and women,
    determining input and output parameters for an intelligent system by considering obtained data input parameters such as including an orthogonal pixel value of a fingerprint, the ridge count, the ridge thickness, and the average ridge thickness and ridge count for fingerprints of men and women,
    distinguishing fingerprints from men and women by using numeric output values,
    creating an intelligent system model based on artificial neural networks (ANN) by selecting data number, determining neurons for input and output layers, a number of hidden layers and the neurons in the hidden layers, and functions preferred in the neurons,
    using back propagation, Levenberg-Marquardt, genetic algorithm, or fuzzy logic for training the created model,
    training the created ANN model with a chosen learning algorithm by a selected number of samples until getting targeted error rate or getting targeted performance,
    testing the obtained intelligent model with a chosen number of fingerprints, and
    determining a threshold value that separates men and women fingerprints by obtained values.

2. The method according to claim 1, wherein the method for real time gender estimation is realized as a web-based or stand-alone application run on a personal computer (PC).

* * * * *